United States Patent Office 3,282,717
Patented Nov. 1, 1966

3,282,717
PRINT PASTE THICKENER
Edward L. Kelley, Ho-Ho-Kus, N.J., assignor to Kelco Company, San Diego, Calif., a corporation of Delaware
No Drawing. Filed Apr. 23, 1963, Ser. No. 274,942
11 Claims. (Cl. 106—205)

This invention relates to improvements in algins, and more particularly to binary mixtures exhibiting startlingly improved properties.

As is well known, alginates, particularly sodium alginate, are an important article of commerce and are used in a wide variety of technological applications, where thickening, suspension, protective colloid action, and the like are desired.

In some applications, performance of the systems including an alginate such as sodium alginate fall somewhat short of the ideal. For example, in textile printing, a thickener is commonly used, but alginates do not always work out well because if the printing paste is acid, gelatinous type of body may be produced which makes screen printing difficult. In alkaline print pastes, the body or the consistency of the system may be what is known as "short," which is likewise undesirable.

An object of the present invention is to produce an algin containing system which gives improved results in aqueous systems independent of acidity and alkalinity.

Another object of the invention is to produce a superior material for imparting proper long flowing rheological properties to textile printing pastes.

Other objects of the invention will appear as the discussion thereof proceeds.

Generally speaking and in accordance with illustrative embodiments of my invention, I combine an alginate such as sodium alginate with guar gum in the relative proportions of within the range 80% sodium alginate=20% guar gum to 60% sodium alginate=40% guar gum. I prefer to use a ratio of 70%:30%, for the sodium alginate:guar gum proportions. These two components are mixed to any degree of intimacy, generally as dry powders, and then added as needed to the aqueous systems to which they are applied.

Guar gum is the refined endosperm of guar seed. The latter is the seed of the leguminous plant *Cyamopsis tetragonoloba*. While guar formerly was obtained exclusively from abroad, for some years it has been grown in the United States and it now represents an important domestically produced article of commerce.

To illustrate the remarkable results obtainable when proceeding in accordance with my invention, I give below the results of a series of tests, using a commercially produced sodium alginate and a commercially produced guar gum. In the present series of tests, in order to obtain an intimate mixture of the two components I started with a 20% solution of alginic acid in water prepared at a commercial algin plant. This was neutralized with sodium carbonate, just enough of the latter being added to give neutrality. The calcium content of the particular alginic acid was relatively low, viz 0.4% as CaO. To this neutral paste I added guar gum in three different concentrations, and after the guar gum had thoroughly dispersed in the solution and been mixed to uniformity therein, the suspension was dried and ground to produce a dry powder.

Next, 2% solutions in water of these mixtures were prepared. A portion of each was set aside and had a neutral pH. To another portion of each, for each 100 parts thereof I added 1½ parts of sodium acetate and 3 parts of 50% acetic acid. To still another portion of each, for each 100 parts I added 2½ parts of triethanolamine and 5 parts of 40° Bé. sodium hydroxide. The consistency of the systems produced is given in the table which follows:

CONSISTENCY OF THICKENERS

| Thickener | | System | Consistency |
|---|---|---|---|
| Case | Algin-Guar | | |
| A | 70-30 | Neutral | Excellent long flow.[1] |
| A | 70-30 | Acid | Do.[1] |
| A | 70-30 | Alkaline | Do.[1] |
| B | 90-10 | Neutral | Thin, weak flow.[2] |
| B | 90-10 | Acid | Do.[2] |
| B | 90-10 | Alkaline | Thin, slightly gelatinous.[2] |
| C | 50-50 | Neutral | Short, gelatinous.[2] |
| C | 50-50 | Acid | Do.[3] |
| C | 50-50 | Alkaline | Do.[3] |

[1] Gives excellent printing qualities.
[2] Gives poor printing (poor definition, flushing, lack of control, etc.).
[3] Gives poor printing (clogs screen, misprints or blank spots in print, short cycles, etc.).

The mixtures produced were also tested commercially as additives to print pastes for textile printing, in neutral, acid, and alkaline print pastes respectively. The results obtained in this series of tests are shown by the reference numerals in the table above, the meaning of the reference numerals being given in the footnotes to the table.

As will be apparent from the discussion hereinabove, system A is at the preferred ratio of sodium alginate to guar gum and gives excellent consistency as well as excellent printing qualities regardless of whether it is used at a neutral, acid, or alkaline pH. Systems B and C are outside of my inventive range, and are not usable in textile printing and moreover even when made up simply into 2% solutions as shown in the table above, exhibit remarkably different properties from the preferred ratio, which is within the scope of the invention.

I have carried out other series of tests, which have established the range already set forth, namely, from 80:20 to 60:40.

I do not know why the mixtures of these two substances within the disclosed and claimed range give the results which I have observed and set forth herein. It is certainly unexpected, however, for neither component alone gives the results observed and even mixtures at the ratios (outside of the inventive range) of 90:10 as well as 50:50 likewise fail to give the superior results which I obtain in accordance with my invention.

While I prefer the use of sodium alginate, I may use other alkali metal alginates including lithium, potassium, and ammonium alginates.

Those skilled in the print paste formulation art will find my thickener useful in a range of about 0.25% to 4.0% by weight of the total print paste formulation, although the amount so used will usually range from about 1% to 2%. Although those knowledgeable in the instant art are aware of the use to be made of a print paste thickener, as an example of such thickeners used in textile printing pastes with both acid and basic dyes, the dyes can be used in an amount of from 0.5% to 6.0% pasted up with 1.0% to 4.0% of a solvent such as thiodiethylene glycol and dissolved with 37.5% to 29% boiling water. This resulting solution is thickened with 50% aqueous solution of my thickener. The said thickener solution is prepared with a sodium alginate guar gum in the ratio of 70:30 and the said solution contains 4% by weight of said alginate and gum and in the said ratio. Following the addition of the thickener solution, 10% of urea is added and 1% sulfocyanide. The print paste formulation so prepared as aforementioned is particularly useful for textile printing. A material printed with a formulation including my new thickener is usually dried and then steamed for about one hour at no more than three pounds pressure.

While I have described my invention with the aid of numerous specific details of components, procedures, and the like, it will be evident that numerous variations are possible, all within the limits of the invention as set forth by the claims which follow.

I claim:

1. As a new and useful print paste thickener composition, a mixture of alkali metal alginate and guar gum within the range of weight ratios of 80:20 and 60:40 alginate:guar gum.

2. The print paste thickener composition in accordance with claim 1 wherein said ratio is 70:30.

3. The print paste thickener composition in accordance with claim 1 wherein said alkali metal is sodium.

4. The print paste thickener composition in accordance with claim 1 wherein said alkali metal is sodium and said ratio is 70:30.

5. The process of modifying the rheological character of an aqueous print paste formulation system, which comprises adding thereto a small amount which is sufficient to impart long-flowing rheological properties to said aqueous print paste formulation system of a mixture of an alkali metal alginate and guar gum within the relative ratio thereof of 80:20 and 60:40.

6. The process of modifying the rheological character of an aqueous print paste formulation which comprises incorporating therewith in an amount sufficient to impart long-flowing rheological properties to said aqueous print paste formulation of an alkali metal alginate and a guar gum within the relative ratio thereof of 80:20 and 60:40.

7. The process in accordance with claim 6 wherein said ratio is 70:30.

8. The process in accordance with claim 6 wherein said alkali metal is sodium.

9. The process in accordance with claim 6 wherein said ratio is 70:30 and said alkali metal is sodium.

10. The process of modifying the rheological character of an aqueous print paste formulation which comprises incorporating therewith an alkali metal alginate and a guar gum within the relative ratio thereof of 80:20 and 60:40, the total amount of the said alginate and guar gum being present in the said formulation in an amount from 0.25% to 4.0% of the weight thereof.

11. The process of modifying the rheological character of an aqueous print paste formulation which comprises incorporating therewith an alkali metal alginate and a guar gum within the relative weight ratio thereof of 80:20 and 60:40, the total amounts of the said alginate and guar gum being present in the said formulation in an amount from about 1% to about 2% of the weight thereof.

References Cited by the Examiner

UNITED STATES PATENTS

| | | | |
|---|---|---|---|
| 341,072 | 5/1886 | Stanford | 106—205 |
| 2,644,749 | 7/1953 | Firsch et al. | 106—208 |
| 3,007,879 | 11/1961 | Jordan | 106—205 |
| 3,046,272 | 7/1962 | Strating et al. | 106—205 |

FOREIGN PATENTS

| | | |
|---|---|---|
| 644,477 | 7/1962 | Canada. |
| 881,487 | 11/1961 | Great Britain. |

ALEXANDER H. BRODMERKEL, *Primary Examiner.*

L. HAYES, *Assistant Examiner.*